US007957771B2

(12) United States Patent
Frerking et al.

(10) Patent No.: US 7,957,771 B2
(45) Date of Patent: Jun. 7, 2011

(54) HANDS-FREE CONFERENCING APPARATUS AND METHOD FOR USE WITH A WIRELESS TELEPHONE

(75) Inventors: Melvin D. Frerking, Norcross, GA (US); Tamara Kimble, Atlanta, GA (US); Christopher Penrose, West Hartford, CT (US); Alonzo L. Watts, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 375 days.

(21) Appl. No.: 10/872,797

(22) Filed: Jun. 21, 2004

(65) Prior Publication Data

US 2005/0282592 A1  Dec. 22, 2005

(51) Int. Cl.
*H04M 1/00* (2006.01)
*H04M 3/42* (2006.01)
*H04M 11/00* (2006.01)
*H04M 9/00* (2006.01)

(52) U.S. Cl. ............... 455/569.1; 455/416; 379/93.21; 379/158; 379/202.01; 379/420.02; 379/203.01; 379/420.03; 379/420.04; 379/204.01; 381/362; 381/74; 381/71.6; 381/111; 370/260; 370/270

(58) Field of Classification Search ............... 455/569.1, 455/416; 379/93.21, 158, 420.01–420.04, 379/201.01, 202.01, 203.01, 204.01; 381/362, 381/74, 71.6, 111; 370/260, 270
See application file for complete search history.

(56) References Cited

U.S. PATENT DOCUMENTS

| | | | |
|---|---|---|---|
| D429,231 S | 8/2000 | Johnsson | |
| 6,339,643 B1* | 1/2002 | Mastrocola et al. | 379/433.06 |
| 6,424,820 B1* | 7/2002 | Burdick et al. | 455/41.1 |
| 6,535,730 B1 | 3/2003 | Chow et al. | |
| 6,941,161 B1* | 9/2005 | Bobisuthi et al. | 455/569.1 |
| 2002/0061103 A1* | 5/2002 | Pehrsson | 379/387.01 |
| 2003/0002644 A1* | 1/2003 | Guccione et al. | 379/202.01 |
| 2003/0035406 A1 | 2/2003 | Fraser et al. | |
| 2004/0116130 A1* | 6/2004 | Seligmann | 455/456.1 |
| 2004/0266443 A1* | 12/2004 | Ito | 455/569.1 |
| 2005/0090252 A1* | 4/2005 | Ando et al. | 455/435.1 |
| 2005/0146227 A1* | 7/2005 | Jackson et al. | 307/113 |

FOREIGN PATENT DOCUMENTS

EP        187696 A2 *  7/1986

OTHER PUBLICATIONS

ClearOne Communications, Max Wireless Audio Conferencing, Product Brief, 2003, www.clearone.com, Salt Lake City, Utah, US.
ClearOne Communications, Max Wireless Audio Conferencing, Demo Sheet, 2003, www.clearone.com, Salt Lake City, Utah, US.

* cited by examiner

*Primary Examiner* — Marivelisse Santiago-Cordero
(74) *Attorney, Agent, or Firm* — Moazzam & Associates, LLC

(57) ABSTRACT

A hands-free teleconferencing apparatus for use with a wireless telephone for enabling multiple users to participate in a telephone call in a hands-free environment. An adapter of the apparatus configured to connect to a wireless telephone includes circuitry for communicating with at least two external speakers and at least one external microphone. The communications between the adapter and the external speakers and microphone may be wired or wireless. If wired, the external speakers and microphone may be part of respective earbud devices or headsets that connect to the adapter. Each earbud device includes an acoustic transducer that functions as an audio speaker and may include a microphone that converts the users' voices into electric audio signals. If wireless, the external speakers and microphone may be in respective headsets that have respective wireless transducers for communicating wirelessly with respective wireless transducers in the adapter.

12 Claims, 8 Drawing Sheets

HANDS-FREE CONFERENCING APPARATUS AND METHOD FOR USE WITH A WIRELESS TELEPHONE

BACKGROUND OF THE INVENTION

1. Field of Invention

The present invention relates to telecommunications and, more particularly, to a hands-free teleconferencing apparatus and method that enable multiple people to participate in a wireless telephone call.

2. Description of Related Art

Current wireless telephones have provisions for the use of hands-free devices that allow the wireless telephone to be used without having to hold the wireless telephone next to user's ear. Current hands-free devices vary from what are commonly called earbuds to various types of headsets. A typical earbud includes an electrical cable having an acoustic transducer on one end, a connector on the other for connecting the earbud to a wireless telephone, and a microphone embedded in the cable between the wireless telephone and the acoustic transducer near the user's mouth. The acoustic transducer functions as a speaker and is typically designed to be inserted into the user's ear. The microphone of the earbud typically is located either near the user's mouth or near the user's ear. In some designs, the microphone is located at the end of a "boom" bracket near the user's mouth.

The connector attached to the end of the cable for connecting the earbud to a wireless telephone is often a standard 2.5 millimeter (mm) connector designed to be inserted into a standard 2.5 mm jack in the housing of the wireless telephone. Some earbud connector designs are not industry standards, but rather, are manufacturer-specific. For example, some connectors are designed to interface with the manufacturer-specific accessory interface of a wireless telephone rather than with a standard 2.5 mm jack.

In many designs, when the connector of the earbud is connected to the telephone, the telephone senses an impedance change that causes the telephone to switch from using the internal earpiece and microphone of the telephone to using the microphone and acoustic transducer of the earbud. Connection of the earbud to the wireless telephone disables the internal earpiece and microphone of the telephone and enables the microphone and acoustic transducer of the earbud.

Some earbuds have a call acceptance/termination switch connected to the earbud cable between the acoustic transducer and the connector. The user momentarily closes the switch to accept an incoming call and then closes the switch again to terminate the call. FIG. 1 illustrates a block diagram of such an earbud device. The earbud device 1 comprises a cable 2 having an acoustic transducer 3 on one end that functions as a speaker and a 2.5 mm connector 4 on the other end for connection with a 2.5 mm jack of a wireless telephone (not shown). A microphone 5 and a switch 6 are connected to the cable 1 at locations between the acoustic transducer 3 and the connector 4.

Some earbud designs include a headset that holds the acoustic transducer against the user's ear by some type of holding mechanism. Such headsets usually include some type of boom for holding the microphone near the user's mouth.

A design intended for use by the hearing impaired community utilizes a magnetic loopset to magnetically couple the acoustic energy from the loopset to hearing aid telecoils of the user's hearing aid.

Although each of the hands-free communications devices described above provides a hands-free environment in which a user is able to participate in wireless telephone calls without having to hold the telephone next to the user's ear, none of the designs enable multiple users to simultaneously participate in a wireless telephone call in a hands-free teleconferencing environment. With the ever-increasing use of wireless telephones, a need exists for a hands-free teleconferencing device that enables multiple users to participate in the same telephone call in a hands-free teleconferencing environment using a single wireless telephone.

SUMMARY OF THE INVENTION

The present invention is directed to a hands-free teleconferencing method and apparatus for use with a wireless communications device, such as a wireless telephone, for example, to enable multiple users to participate in the same telephone call without having to use their hands. The apparatus of the invention includes an adapter that connects to a wireless telephone. The adapter has circuitry configured to send audio signals to audio speakers that are external to the wireless communications device. The adapter also has circuitry configured to receive audio signals generated by a microphone that is external to the wireless communications device, which the adapter then provides to the wireless communications device (e.g., a telephone). The communication between the adapter circuitry and the speakers and microphones may be wired or wireless.

In accordance with an embodiment, the adapter circuitry is configured to interface with at least two earbud devices. Each earbud device has an acoustic transducer that functions as the audio speaker. At least one of the earbud devices has a microphone that converts the user's voice into electric audio signals, which are then provided to the adapter circuitry. A cable of the earbud device connects on one end thereof to the adapter. The speakers and microphones are connected to the earbud cable.

In accordance with an embodiment, the earbud devices are fixedly electrically connected to the adapter. In accordance with another embodiment, each of the earbud devices has a connector designed to enable the earbud to be removably electrically connected to a mating receptacle of the adapter. In accordance with another embodiment, one of the earbud devices has a connector designed to enable the earbud device to be removably electrically connected to the adapter and the other earbud device is fixedly connected to the adapter.

The connectors of the earbud devices may be known connectors, such as standardized 2.5 mm connectors designed to connect to standardized 2.5 mm mating receptacles currently found on many wireless telephones. Alternatively, the connectors and mating receptacles may be non-standardized (e.g., manufacturer specific) connectors and receptacles.

In accordance with another embodiment, the adapter includes a radio receiver and/or audio entertainment device such as, for example, a compact disk (CD), tape or MP3 player to allow the user to listen to music, news programs, etc., through the acoustic transducer of the earbud device. In accordance with another embodiment, at least one of the earbud devices includes a mute switch that can be switched on to disable the microphone of the other earbud device.

In accordance with another embodiment, the adapter has first and second wireless transceivers that communicate with respective wireless transceivers located on (or in) headsets via respective wireless links. The headsets have acoustic speakers and microphones. An example of suitable transceivers for this purpose are BLUETOOTH transceivers, which utilize the well known BLUETOOTH communications protocol.

The invention provides a method for communicating audio signals between the wireless communications device and the external speakers and microphones of at least two headsets or earbud devices. The method applies to both wired and wireless communications between the adapter and the headsets or earbud devices. The wireless communications device (e.g., a telephone) receives wireless signals transmitted to it and processes and decodes the signals. The processed and decoded signals are then sent to the first and second external audio speakers of the headset or earbud device. If the transmission to the external speakers is wireless, then wireless (e.g., BLUETOOTH) transceivers of the adapter format the signals into short range (e.g., BLUETOOTH) RF signals, which are then transmitted to and decoded by the wireless transceivers in the headset. If the transmission to the external speakers is wired, then the signals are simply communicated via the cables from the adapter circuitry to the external speakers.

The invention also provides a method for transmitting signals generated by the microphone to the adapter circuitry and then to the processing and encoding circuitry of the wireless communications device. When that user speaks, the microphone converts the acoustic signals into electrical signals that are transmitted from the headset or earbud device to the adapter. If the transmission is wireless, a wireless transceiver in the headset comprising the microphone receives the electrical signal generated by the microphone and converts it into a wireless format, such as the BLUETOOTH format, that is compatible with the wireless technology of the corresponding wireless transceiver of the adapter. If the transmission is wired, the electrical signals generated by the microphone are simply conducted over the cable of the headset or earbud device to the adapter circuitry.

The adapter circuitry receives the wired or wireless signals transmitted by the headset or earbud device to the adapter circuitry. If the signals transmitted to the adapter circuitry are wireless signals, they are processed by a wireless (e.g., BLUETOOTH) transceiver of the adapter circuitry before being processed by the processing and encoding circuitry of the wireless communications device. If the signals were transmitted to the adapter circuitry over a wire, they are simply forwarded to the processing and encoding circuitry of the wireless communications device. The processing and encoding circuitry of the wireless communications device processes and encodes the signals for transmission to the base station.

These and other features and advantages of the present invention will become apparent from the following description, drawings and claims.

DETAILED DESCRIPTION OF EXEMPLARY EMBODIMENTS

The present invention provides a hands-free teleconferencing method and apparatus for use with a wireless telephone for enabling multiple users to participate in a telephone call in a hands-free environment. An adapter of the apparatus is configured to connect to a wireless telephone. The adapter includes circuitry for communicating with at least two external speakers and at least one external microphone.

The communications between the adapter and the external speakers and microphone may be wired or wireless. If wired, the external speakers and microphone may be part of respective earbud devices that connect to the adapter. Each earbud device includes an acoustic transducer that functions as an audio speaker and may include a microphone that converts the users' voices into electric audio signals.

If communications between the adapter and the external speakers are wireless, the external speakers may be in respective headsets that have respective wireless transceivers for communicating wirelessly with respective wireless transceivers in the adapter. At least one of the headsets includes a microphone. Signals produced by the microphone are transmitted by the wireless transceiver of the respective headset to the respective wireless transceiver of the adapter.

Figure 2:
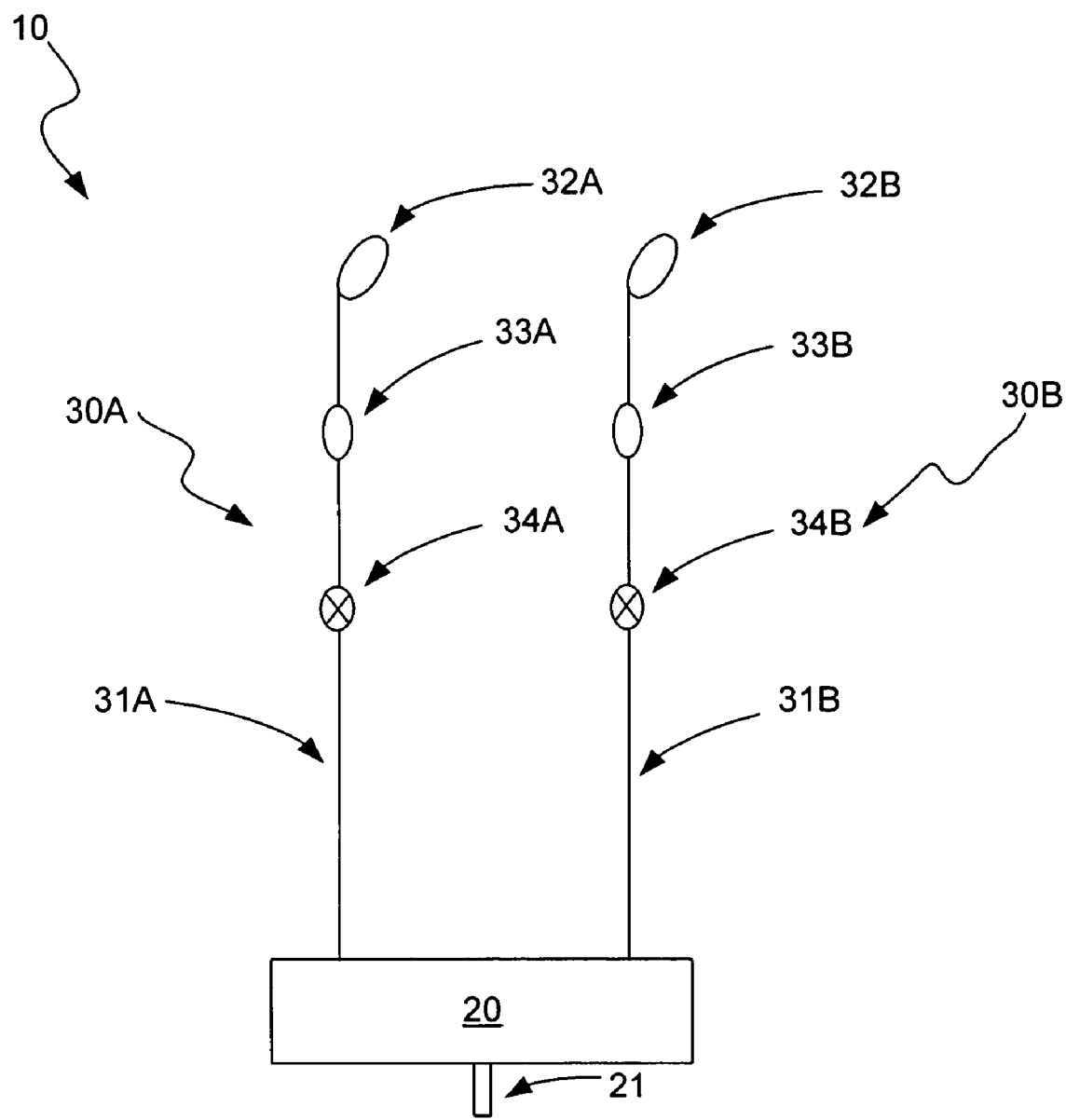
FIG. 2 illustrates a block diagram of the hands-free wireless telephone conferencing device of the invention in accordance with an embodiment for enabling multiple users to participate in a wireless telephone call in a hands-free environment.

FIG. 2 is a block diagram of the teleconferencing apparatus of the present invention in accordance with an embodiment. In accordance with this embodiment, the teleconferencing apparatus 10 comprises an adapter 20. The adapter 20 is configured to enable known earbud devices 30A and 30B to be fixedly electrically connected to the adapter 20. The adapter 20 includes a connector 21, such as a 2.5 mm connector, for example, configured for connecting the adapter 20 to a 2.5 mm mating receptacle (not shown) of a wireless communications device (not shown).

The term "earbud device", as that term is used herein, is intended to denote any type of hands-free devices that can be connected to a wireless communications device (e.g., a telephone). Such devices typically have acoustic transducers designed to be inserted into a user's ear and in-line microphones. The term "earbud device" is also intended to include headsets that have microphones mounted on booms.

Figure 1:
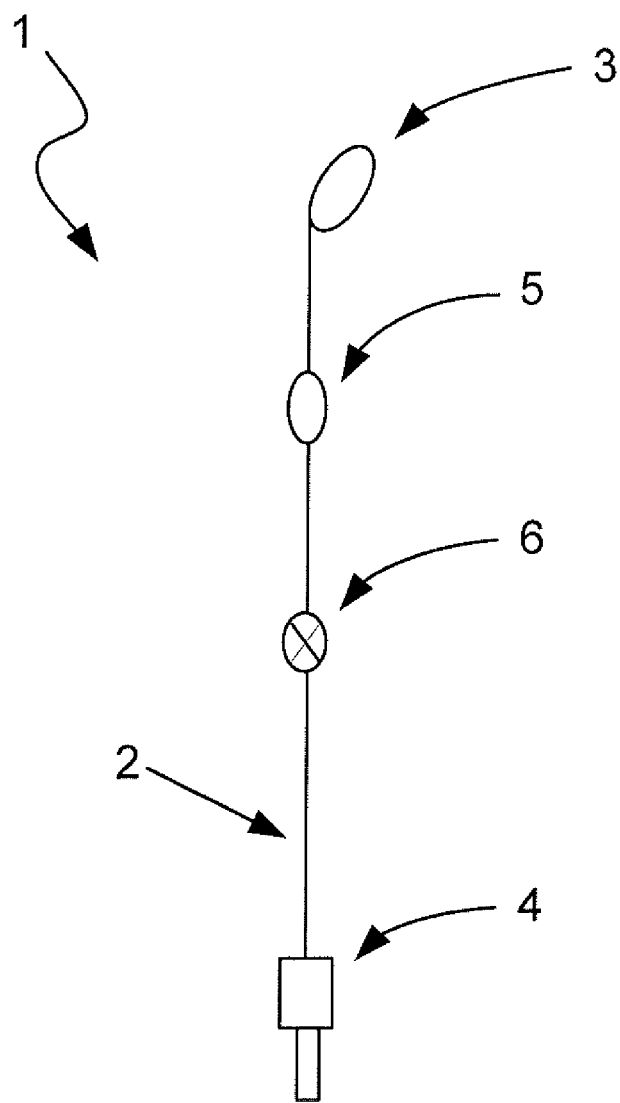
FIG. 1 illustrates a block diagram of a known hands-free communications device for use with a wireless telephone to enable a user to participate in a wireless telephone call without having to hold the telephone.

With reference again to FIG. 2, earbud device 30A comprises an electrical cable 31A that is fixedly electrically connected on one end thereof to the adapter 20. An acoustic transducer 32A, which functions as an audio speaker, typically is connected to the end of the cable 31A opposite the adapter 20. A microphone 33A typically is connected to the cable 31A at a location between the acoustic transducer 32A and the adapter 20. The earbud devices 30A and 30B shown in FIG. 2 may be the same as, or similar to, the known earbud device 1 shown in FIG. 1, with the exception that the earbud devices 30A and 30B shown in FIG. 2 do not include the 2.5 mm connectors 4 shown in FIG. 1.

In accordance with an embodiment of the present invention, either or both of the earbud devices 30A and 30B includes a switch 34A and 34B, respectively. These switches 34A and 34B are used for accepting and terminating calls via momentary closure of contact switch. The switches 34A and 34B are optional.

The wireless communications device, which may be a telephone, for example, senses an impedance change when the connector 21 of the adapter 20 is connected to the mating receptacle of the telephone and automatically disables the internal earpiece and microphone of the telephone and enables the acoustic transducers 32A, 32B and microphones 33A, 33B of the earbud devices 30A, 30B. When the adapter 20 is disconnected from the wireless telephone, the telephone will sense an impedance change and automatically enable the earpiece and microphone of the telephone.

Figure 3:
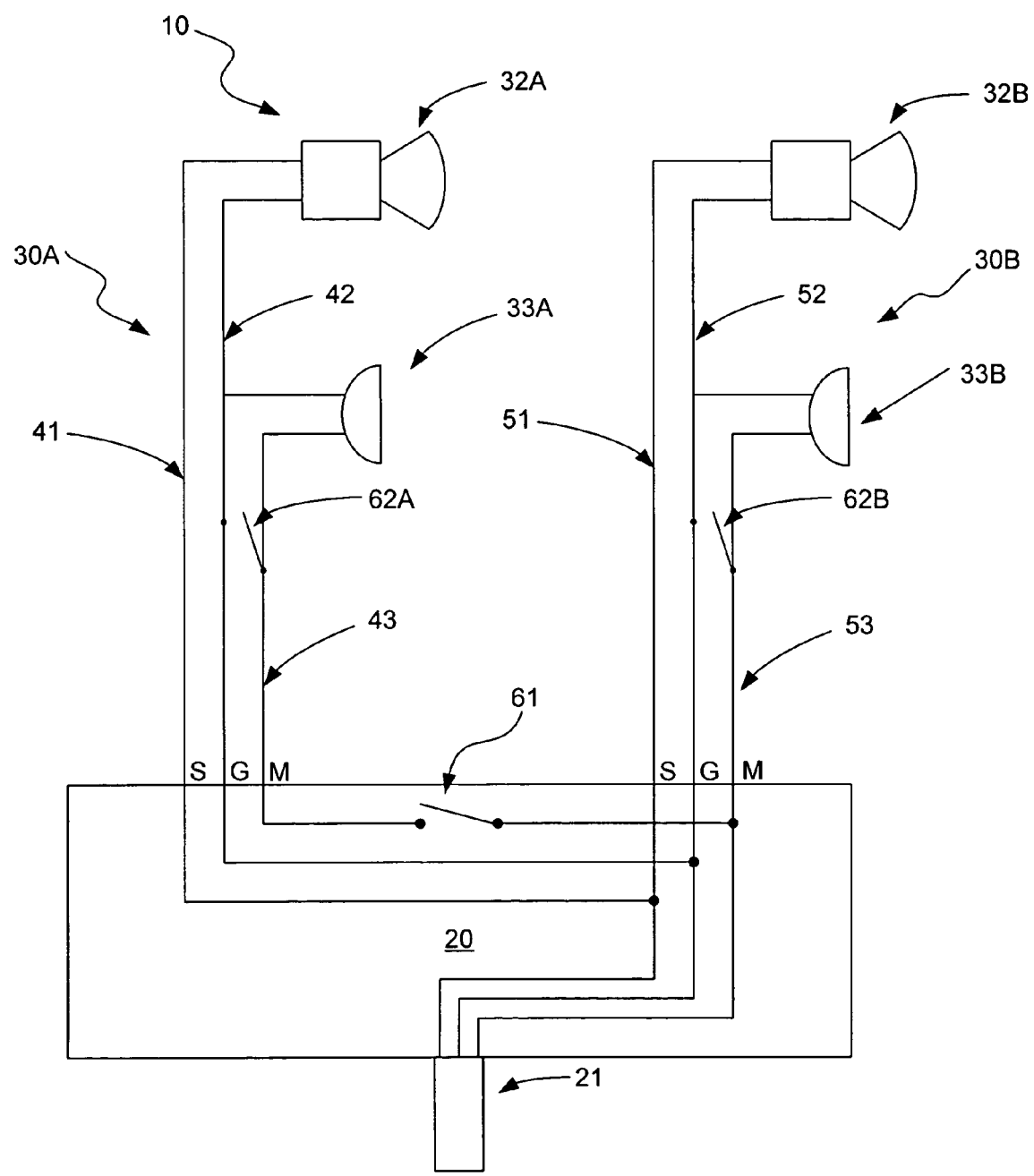
FIG. 3 illustrates a schematic diagram of the adapter of the hands-free wireless telephone conferencing device of the invention in accordance with an embodiment.

FIG. 3 illustrates a schematic diagram of the circuitry of the adapter 20 in accordance with an embodiment. The cable 31A shown in FIG. 2 encases a speaker wire 41, a ground wire 42 and a microphone wire 43. Likewise, the cable 31B shown in FIG. 2 encases a speaker wire 51, a ground wire 52 and a microphone wire 53. The speaker wires 41 and 51 connect speaker terminals S on the adapter 20 to the acoustic transducers 32A and 32B, respectively. The microphone wires 43 and 53 connect microphone terminals M on the adapter 20 to the microphones 33A and 33B, respectively. The ground wire 42 is connected to both the acoustic transducer 32A and the microphone 33A and to a ground terminal G on the adapter 20. Likewise, the ground wire 52 is connected to both the acoustic transducer 32B and the microphone 33B and to a ground terminal G on the adapter 20.

In accordance with this embodiment, the earbud devices 30A and 30B include switches 62A and 62B, respectively. When either of the switches 62A or 62B is momentarily closed, the wireless telephone will sense a change in impedance at the connection between the adapter connector 21 and the corresponding connector receptacle of the telephone. When the wireless telephone senses this change in impedance, the wireless telephone accepts an incoming call or terminates an ongoing call. The switches 62A and 62B are optional.

Inside of the adapter 20, the ground terminals G are tied together, the speaker terminals S are tied together and the microphone terminals M are tied together. Therefore, the earbud devices 30A and 30B are in parallel with each other. The connector 21 of the adapter 20 provides the connections between the S, G, M terminals of the adapter 20 and corresponding connections (not shown) in the wireless telephone. The earbud devices 30A and 30B will receive the same signals from the telephone on the speaker wires 41 and 51, respectively. Electrical signals on microphone wires 43 and 53 will be received at the same node of the transmitter circuitry of the transceiver circuitry (not shown) of the wireless telephone.

It should be noted that the configuration of the adapter circuit shown in FIG. 3 is only one of many possible configurations that can be used to accomplish the goal of enabling multiple users to participate in a telephone call using a single wireless telephone. The adapter circuit shown in FIG. 3 is a relatively simple arrangement, but other arrangements may also be used. In addition, although only two earbud devices 30A and 30B are shown in FIG. 3, the adapter 20 may have circuitry configured to connect more than two earbud devices. Furthermore, adapters of the type shown in FIG. 3 can be interconnected with each other, or cascaded, to allow more than two users to teleconference using the same telephone. The adapter circuitry may also include passive components (e.g., resistors) and active components (e.g., amplifiers) depending on the desired adapter design.

The adapter 20 shown in FIG. 3 includes a mute switch 61 that the user can manually switch to mute the microphone 33A of the earbud device 30A. This feature is useful if the user of the wireless telephone wishes to allow another user to listen to the telephone conversation via acoustic transducer 32A, but to prevent the other user's voice from being heard during the telephone conversation. By opening the switch 61, the microphone 33A of earbud device 30A is disabled. This feature also prevents the user of device 30A from accepting or terminating a call. The switch 61 is optional. As another optional alternative, the microphone 33A could be eliminated entirely so that the user of the earbud device 30A would only be able to listen to the telephone conversation.

Figure 4:
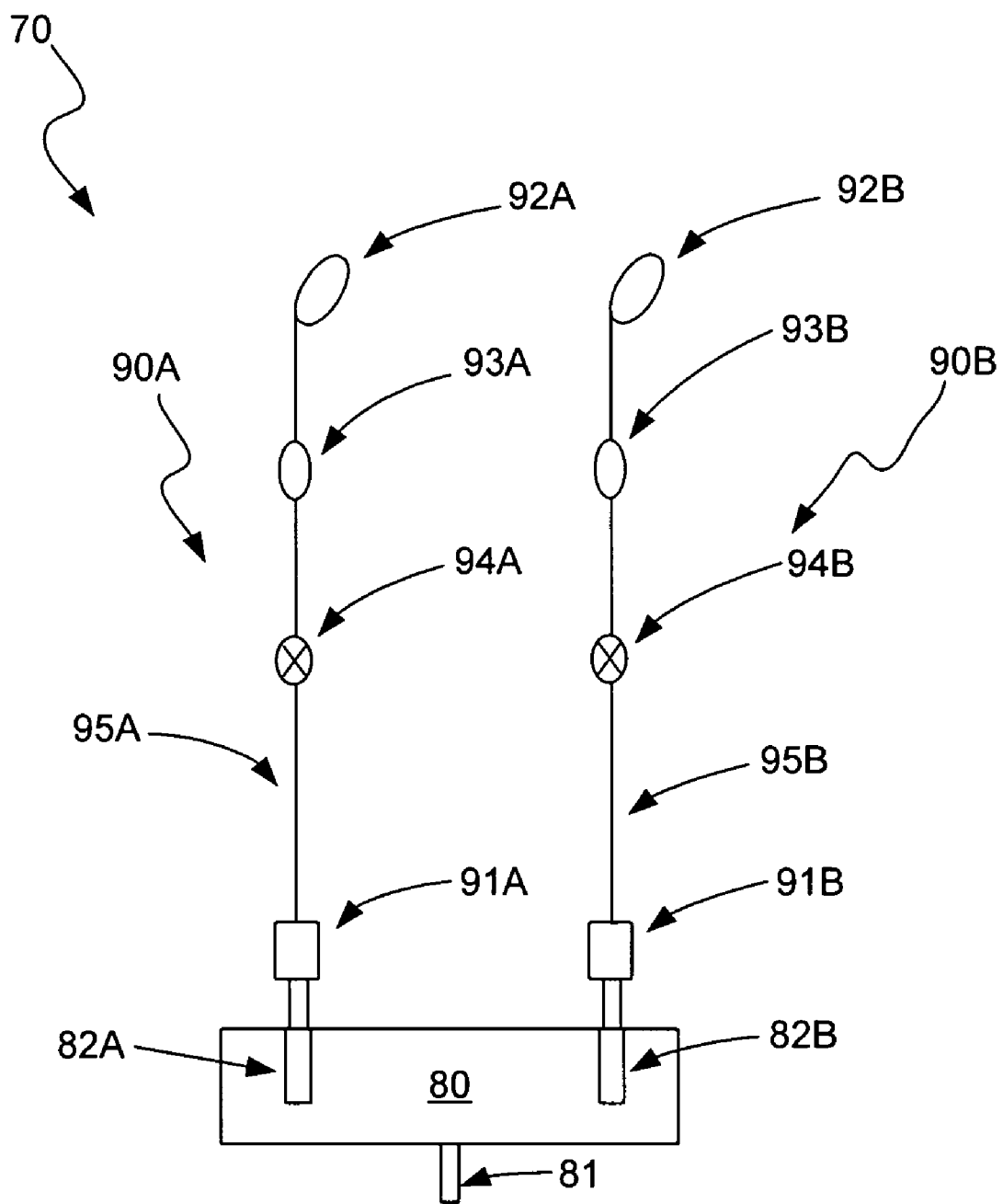
FIG. 4 illustrates a block diagram of the hands-free wireless telephone conferencing device of the invention in accordance with another embodiment for enabling multiple users to participate in a wireless telephone call in a hands-free environment.

FIG. 4 illustrates another embodiment of the wireless hands-free conferencing apparatus of the present invention. In accordance with this embodiment, the apparatus 70 comprises an adapter 80. First and second earbud devices 90A and 90B are removably electrically connected to the adapter 80. The earbud devices 90A and 90B are identical to the earbud devices 30A and 30B shown in FIG. 2 except that the earbud devices 90A and 90B include connectors 91A and 91B, respectively. The connectors 91A and 91B are configured to connect to mating receptacles 82A and 82B, respectively, of the adapter 80. The connectors 91A and 91B may be, for example, standard 2.5 mm connectors, in which case the receptacles 82A and 82B are standard 2.5 mm receptacles. One of the advantages of configuring the adapter 80 with standard 2.5 mm mating receptacles is that existing earbud devices that include 2.5 mm connectors can be connected to the adapter 80. Other connectors and adapter interfaces may also be used to provide the removable connection between the earbud devices 90A and 90B and the adapter 80.

The circuitry of the adapter 80 may be identical to the circuitry of the adapter 20 shown in FIGS. 2 and 3. Modifications of the type described above with reference to the circuitry of the adapter 20 may also be made to the circuitry of the adapter 80. In all other respects, the earbud devices 90A and 90B may be identical to the earbud devices 30A and 30B shown in FIGS. 2 and 3. The earbud devices 90A and 90B include acoustic transducers 92A and 92B, respectively, and microphones 93A and 93B, respectively, which are connected to the adapter 80 by cables 95A and 95B. The earbud devices 90A and 90B may optionally include switches 94A and 94B, respectively, for accepting and terminating calls. Alternatively or additionally, adapter 80 may include a mute switch for disabling microphone 93A and switch 94A of earbud device 90A.

Figure 5:
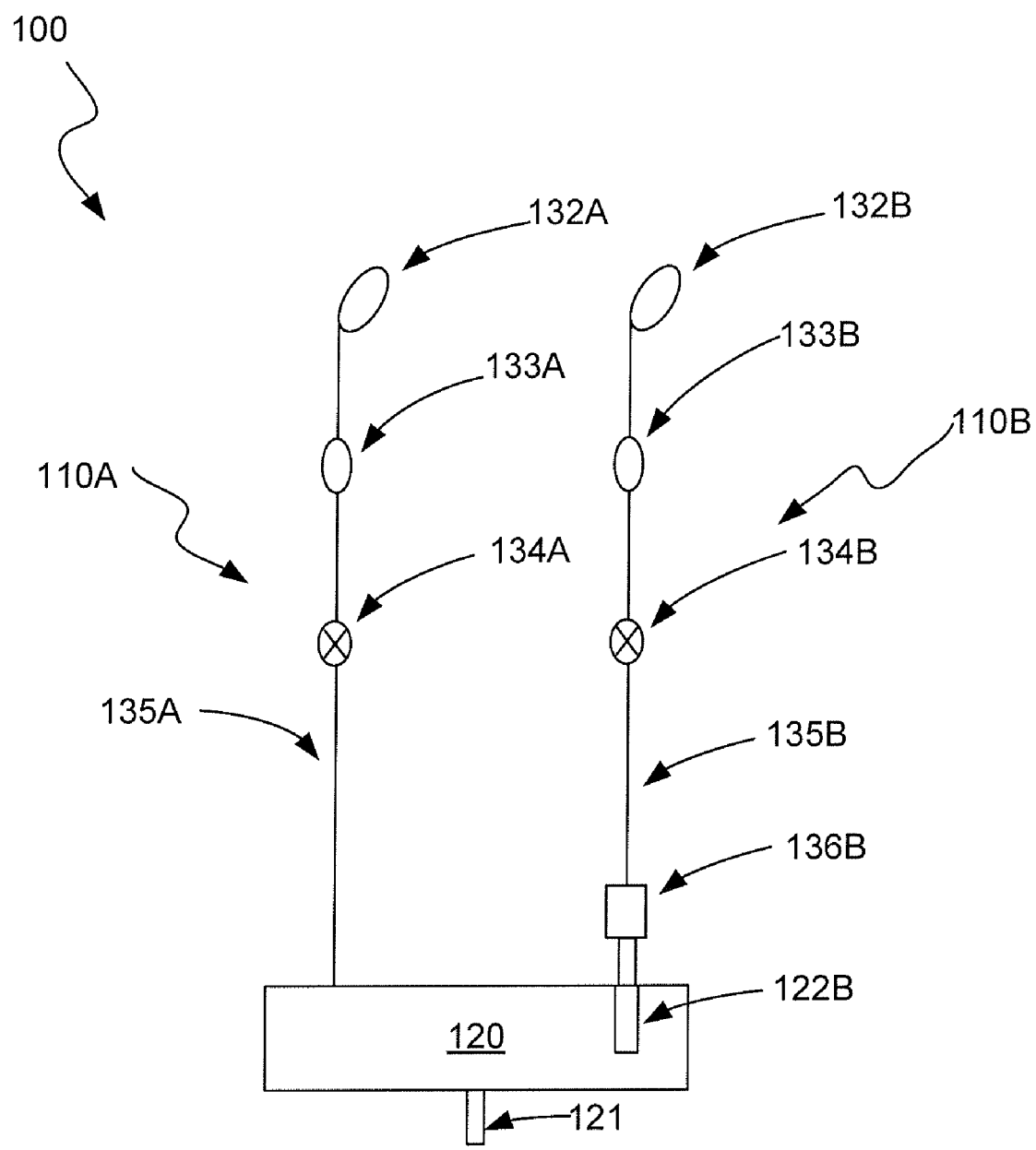
FIG. 5 illustrates a block diagram of the hands-free wireless telephone conferencing device of the invention in accordance with another embodiment for enabling multiple users to participate in a wireless telephone call in a hands-free environment.

FIG. 5 illustrates another embodiment of the wireless hands-free conferencing apparatus of the present invention. In accordance with this embodiment, the apparatus 100 comprises an adapter 120, first earbud device 110A fixedly electrically connected to adapter 120 and second earbud device 110B removably electrically connected to the adapter 120. The earbud devices 110A and 110B are identical to the earbud devices 30A and 30B shown in FIG. 2 except that the earbud device 110B includes a connector 136B, whereas the earbud device 110A is fixedly connected to the adapter 120. The connector 136B is configured to removably connect to mating receptacle 122B of adapter 120. The connector 136B may be, for example, a standard 2.5 mm connector, in which case the receptacle 122B is a standard 2.5 mm receptacle. Other connectors and adapter interfaces may also be used to provide the removable connection between the earbud device 110B and the adapter 120.

The circuitry of the adapter 120 may be identical to the circuitry of the adapter 20 shown in FIGS. 2 and 3. Modifications of the type described above with reference to the circuitry of the adapter 20 may also be made to the circuitry of the adapter 120. In all other respects, the earbud device 110A may be identical to the earbud device 30A and 30B shown in FIGS. 2 and 3 and the earbud device 110B may be identical to the earbud devices 90A and 90B shown in FIG. 4.

The earbud devices 110A and 110B include acoustic transducers 132A and 132B, respectively, and microphones 133A and 133B, respectively, which are connected to the adapter 120 by cables 135A and 135B. The earbud devices 110A and 110B may optionally include switches 134A and 134B, respectively, for accepting and terminating calls. Alternatively or additionally, adapter 120 may have a mute switch for enabling and disabling the microphone 133A and switch 134A of earbud device 110A.

The adapter 120 is connected to a wireless telephone by inserting adapter connector 121 into a mating receptacle (not shown) of the wireless telephone. The adapter connector 121 may be, for example, a standard 2.5 mm connector, in which case the receptacle of the wireless telephone is a 2.5 mm jack. As indicated above, other connector/receptacle designs are also suitable for this purpose.

Figure 6:
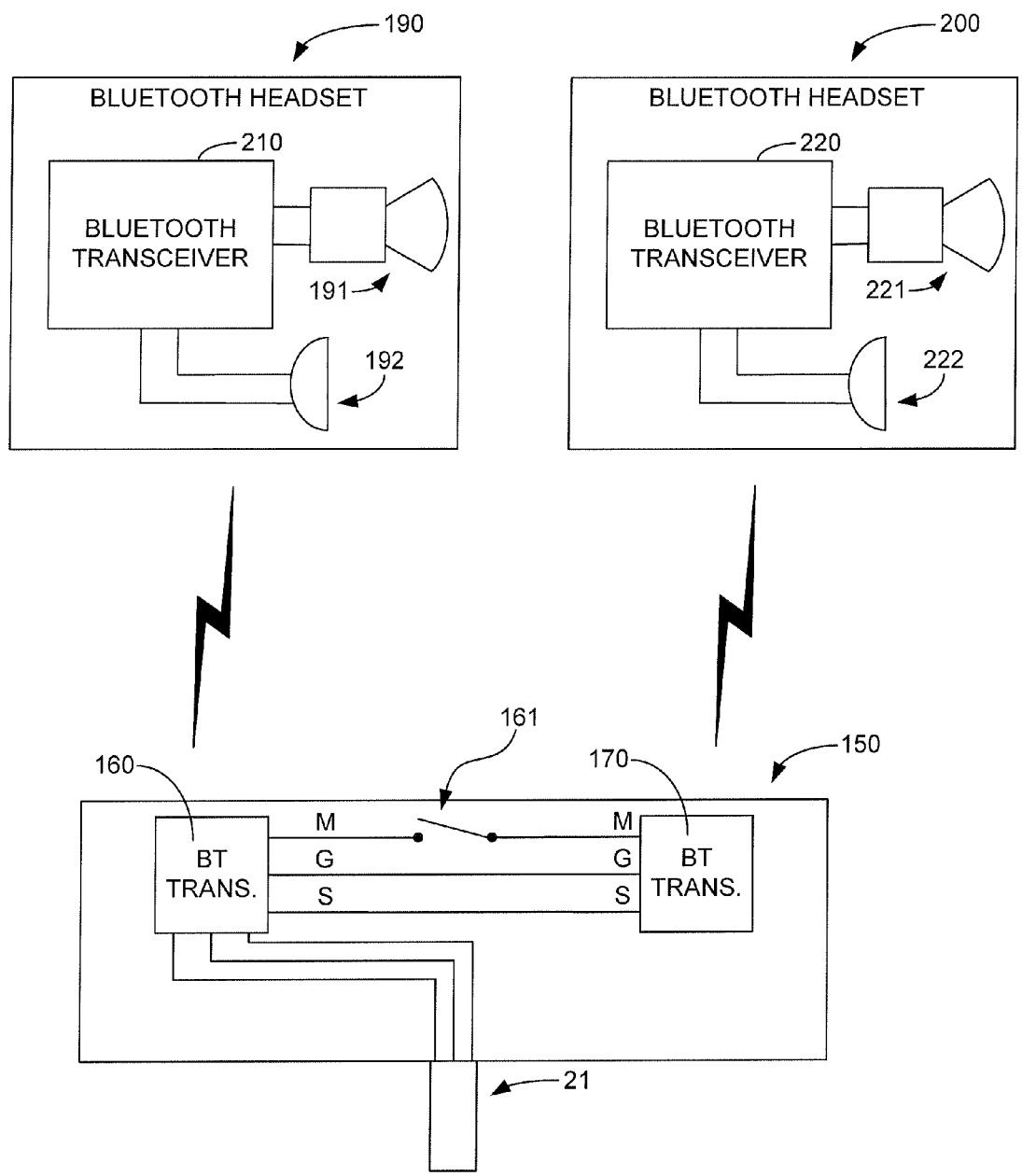
FIG. 6 illustrates a block diagram of the hands-free wireless telephone conferencing device of the invention in accordance with another embodiment, wherein at least one user has a headset that has a wireless transceiver that communicates wirelessly with a wireless transceiver located in the adapter.

FIG. 6 illustrates a block diagram of the hands-free wireless telephone conferencing device of the invention in accordance with another embodiment. In accordance with this embodiment, at least one user has a headset that communicates wirelessly with a wireless transceiver located in the adapter. The adapter 150 comprises at least one, and preferably two, BLUETOOTH transceivers 160 and 170, as well as circuitry for enabling the transceivers 160 and 170 to communicate with each other. The circuitry preferably includes a switch 161 that can be opened by one of the users to disable the microphone associated with a BLUETOOTH transceiver 220 located in the headset 200 of one of the users. The adapter 150 connects to a wireless communications device via connector 21, which may be, for example, a 2.5 mm connector.

The headset 190 includes a BLUETOOTH transceiver 210 that is configured to communicate with the BLUETOOTH transceiver 160 of the adapter 150. Likewise, the headset 200 includes a BLUETOOTH transceiver 220 that is configured to communicate with the BLUETOOTH transceiver 170 of the adapter 150. The BLUETOOTH transceivers 210 and 220 of the headsets 190 and 200 receive encoded radio frequency (RF) signals from the BLUETOOTH transceivers 160 and 170 and output corresponding audio signals to the respective audio transducers 191 and 221. The BLUETOOTH transceivers 210 and 220 of the headsets 190 and 200 receive audio signals from the respective microphones 192 and 222 and process them in accordance with the BLUETOOTH protocol and then transmit them over the respective RF links to the respective BLUETOOTH transceivers 160 and 170 in the adapter 150.

Although the adapter 150 is shown as having two BLUETOOTH transceivers 160 and 170, it could instead have only one BLUETOOTH transceiver 160. In this case, the transceiver 170 would be replaced by one of the earbud devices shown in FIGS. 2-5. It should also be noted that the adapter 150 could have more than two BLUETOOTH transceivers for communicating wirelessly with BLUETOOTH transceivers of more than two headsets.

Figure 7:
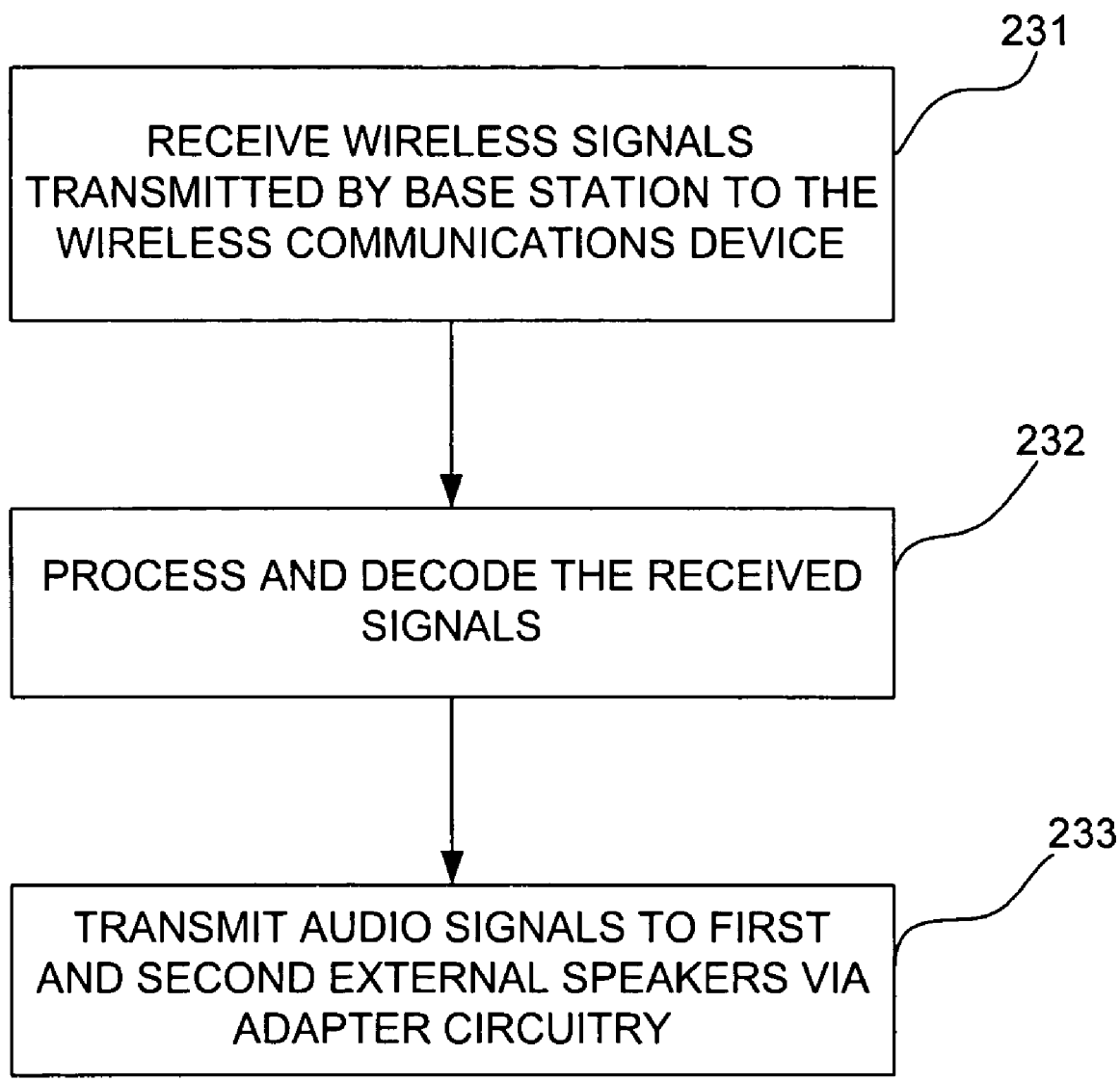
FIG. 7 illustrates a flow chart of the method of the invention in accordance with an embodiment for communicating audio signals between the wireless communications device and the external speakers of at least two headsets or earbud devices.

FIG. 7 illustrates a flow chart of the method of the invention in accordance with an embodiment for communicating audio signals between the external speakers and microphone of the headsets or earbud devices and the wireless communications device. The method applies to both wired and wireless communications between the adapter and the headsets or earbud devices. The wireless communications device (e.g., a telephone) receives wireless signals transmitted to it and processes and decodes the signals, as indicated by blocks 231 and 232. The processed and decoded signals are then transmitted to the first and second external audio speakers of the headset or earbud device, as indicated by block 233. If the transmission to the external speakers is wireless, then wireless (e.g., BLUETOOTH) transceivers of the adapter format the signals into short range (e.g., BLUETOOTH) RF signals, which are then transmitted to and decoded by the wireless transceivers in the headset. If the transmission to the external speakers is wired, then the signals are simply communicated via the cables from the adapter circuitry to the external speakers.

Figure 8:
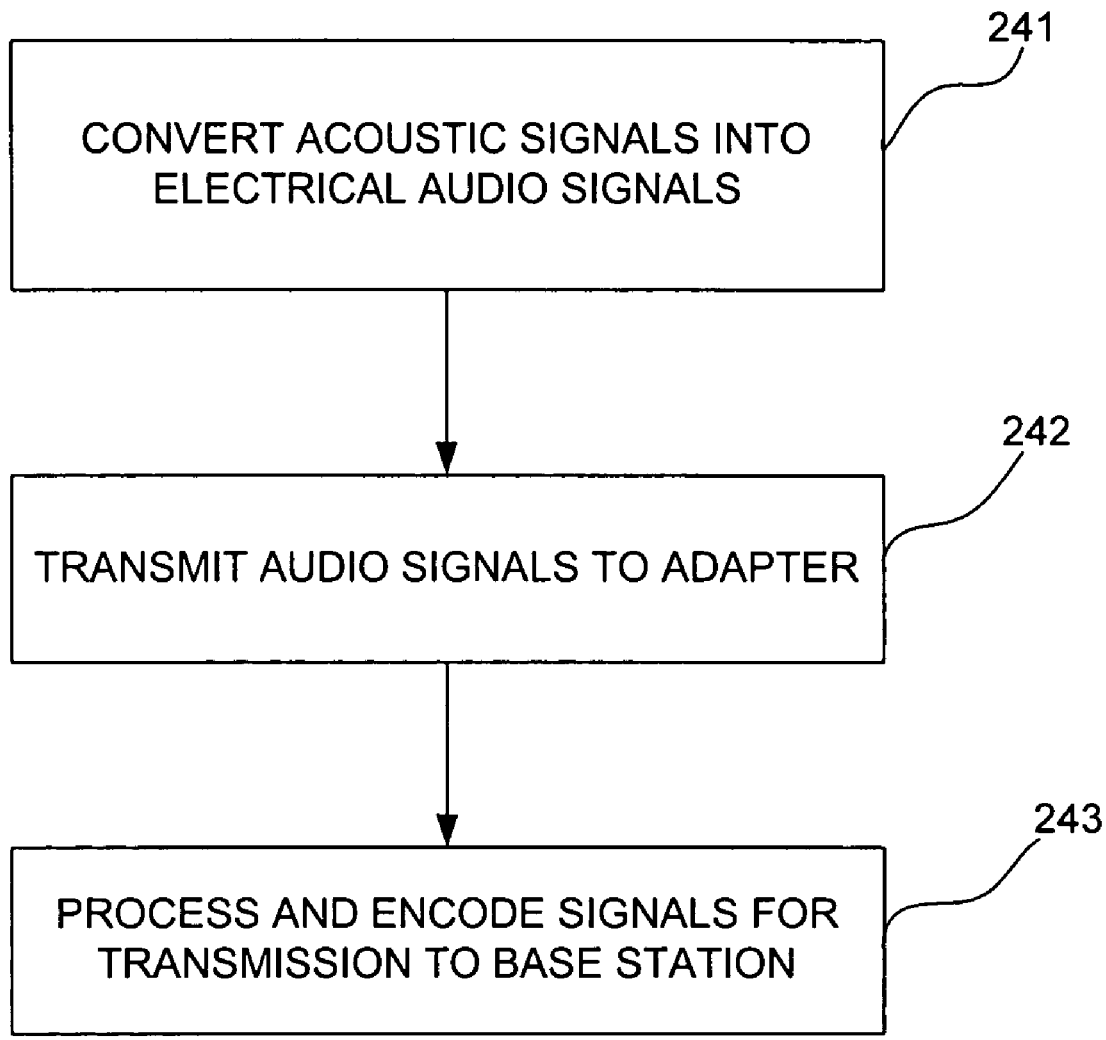
FIG. 8 illustrates a flow chart of the method of the invention in accordance with an embodiment for transmitting signals generated by the microphones of at least two headsets or earbud devices to the adapter circuitry and then to the processing and encoding circuitry of the wireless communications device.

As stated above, at least one of the conferencing devices is equipped with a microphone for transmitting the voice of the user. FIG. 8 illustrates a flow chart of the method of the invention in accordance with an embodiment for transmitting signals generated by the microphone to the adapter circuitry and then to the processing and encoding circuitry of the wireless communications device. When that user speaks, the microphone converts the acoustic signals into electrical signals that are transmitted from the headset or earbud device to the adapter, as indicated by block 241 in FIG. 8. If the transmission is wireless, a wireless transceiver in the headset comprising the microphone receives the electrical signal generated by the microphone and converts it into a wireless format, such as the BLUETOOTH format, that is compatible with the wireless technology of the corresponding wireless transceiver of the adapter. If the transmission is wired, the electrical signals generated by the microphone are simply conducted over the cable of the headset or earbud device to the adapter circuitry.

The adapter circuitry receives the wired or wireless signals transmitted by the headset or earbud device to the adapter circuitry, as indicated by block 242 in FIG. 8. If the signals transmitted to the adapter circuitry are wireless signals, they are processed by a wireless (e.g., BLUETOOTH) transceiver of the adapter circuitry before being processed by the processing and encoding circuitry of the wireless communications device. If the signals were transmitted to the adapter circuitry over a wire, they are simply forwarded to the processing and encoding circuitry of the wireless communications device. The processing and encoding circuitry of the wireless communications device processes and encodes the signals or transmission to the base station, as indicated by block 243 in FIG. 8.

It should be noted that although the present invention has been described with reference to particular embodiments, the present invention is not limited to the embodiments described herein. Modifications can be made to the embodiments described herein and all such modifications are within the scope of the invention. For example, the earbud devices can be connected to the adapter by a variety of connector/receptacle configurations. Likewise, the adapter can be connected to the wireless telephone by a variety of connector/receptacle configurations.

The present invention also is not limited with respect to the adapter circuitry. Variations to the adapter circuitry other than those described above may also be made. For example, the adapter circuitry may include a radio receiver or audio entertainment device, such as, for example, a tape, compact disk (CD) or MP3 player to allow a user to listen to music, news, programs, etc. through the conferencing apparatus. Monaural and stereo earbuds may be used with the conferencing apparatus. An example of stereo earbuds that may be used with the conferencing apparatus of the invention are those currently offered with the Nokia 3300 wireless telephone.

In addition, the conferencing apparatus may include passive and/or active noise cancellation components for the acoustic transducer or microphone of the conferencing apparatus. Those skilled in the art will understand, in view of the present disclosure, how these additional features may be incorporated into the conferencing apparatus. Those skilled in the art will understand the manner in which other modifications can be made to the embodiments described herein without deviating from the scope of the present invention.

What is claimed is:

1. A teleconferencing apparatus for use with a single wireless communications device and for use with first and second wireless headsets the teleconferencing apparatus comprising:
   an adapter configured for connection to the single wireless communications device and to the first and second wireless headsets, each wireless headset including at least an acoustic transducer that functions as a speaker,
   wherein each wireless headset includes a microphone and a wireless transceiver, wherein the wireless transceiver in each wireless headset receives an electrical signal generated by the microphone and converts the electrical signal into a wireless format;
   wherein the adapter comprises a first wireless transceiver and a second wireless transceiver, each wireless transceiver in the adapter configured to format wireless signals into short range radio frequency (RF) signals, which are then transmitted to and decoded by the wireless transceivers in the first and second wireless headsets, respectively;
   wherein at least one of the wireless headsets further comprises an acceptance/termination switch, which, when actuated, causes a wireless call to be accepted or terminated;
   wherein the adapter includes circuitry enabling the first wireless transceiver and the second wireless transceiver in the adapter to communicate with each other;
   wherein the adapter includes a mute switch, which, when actuated, disables the microphone of one of the wireless headsets, the actuated mute switch also preventing the one wireless headset with disabled microphone from accepting or terminating the wireless call while keeping the other wireless headset enabled, and
   wherein the teleconferencing apparatus enables multiple users to participate in a telephone call over the single wireless communications device using the first and second wireless headsets.

2. The teleconferencing apparatus of claim 1, wherein the adapter further comprises a radio receiver that allows a user to listen to radio programming through the acoustic transducer of one of the wireless headsets.

3. The teleconferencing apparatus of claim 1, wherein the adapter further comprises a digital recording device having digital content stored thereon to enable a user to hear the content through the acoustic transducer of one of the wireless headsets.

4. The teleconferencing apparatus of claim 1, wherein the adapter includes a connector for connecting the adapter to the wireless communications device.

5. The teleconferencing apparatus of claim 4, wherein the connector of the adapter is a 2.5 millimeter (mm) connector configured to mate with a 2.5 mm mating receptacle of the wireless communications device.

6. The teleconferencing apparatus of claim 1, wherein at least one of the wireless headsets further comprises a boom bracket, the microphone of the headset being mounted on an end of the boom bracket.

7. The teleconferencing apparatus of claim 1, wherein each microphone includes a passive noise cancellation device.

8. The teleconferencing apparatus of claim 1, wherein each acoustic transducer includes a passive noise cancellation device.

9. The teleconferencing apparatus of claim 1, wherein each microphone includes an active noise cancellation device.

10. The teleconferencing apparatus of claim 1, wherein each acoustic transducer includes an active noise cancellation device.

11. The teleconferencing apparatus of claim 1, wherein the switch is actuated to disable communications being sent by the wireless transceiver of the second wireless headset to the second wireless transceiver of the adapter while keeping communications sent by the wireless transceiver of the first wireless headset to the first wireless transceiver of the adapter enabled.

12. The teleconferencing apparatus of claim 1, wherein the wireless headsets utilize an industry standard communications protocol used to communicate with a variety of communications devices.

* * * * *